US009652117B2

(12) United States Patent
Brown

(10) Patent No.: US 9,652,117 B2
(45) Date of Patent: May 16, 2017

(54) DISPLAYING A REPRESENTATION OF DATA IN CONDITIONS OF LIMITED VISUAL SPACE

(75) Inventor: Kevin Lynn Brown, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 1158 days.

(21) Appl. No.: 12/388,124

(22) Filed: Feb. 18, 2009

(65) Prior Publication Data
US 2010/0211896 A1    Aug. 19, 2010

(51) Int. Cl.
G06F 3/0482    (2013.01)
(52) U.S. Cl.
CPC .................. G06F 3/0482 (2013.01)
(58) Field of Classification Search
CPC .................................................... G06F 3/0482
USPC .......... 715/764, 810, 835, 837, 828
See application file for complete search history.

(56) References Cited

U.S. PATENT DOCUMENTS

| 5,283,864 | A | * | 2/1994 | Knowlton ...................... 715/776 |
| 5,632,009 | A | | 5/1997 | Rao et al. |
| 5,880,742 | A | | 3/1999 | Rao et al. |
| 5,883,685 | A | | 3/1999 | Mazaki et al. |
| 5,977,948 | A | * | 11/1999 | Nishibori ............... G06F 3/0236 345/467 |
| 6,085,202 | A | | 7/2000 | Rao et al. |
| 6,105,036 | A | * | 8/2000 | Henckel |
| 6,252,597 | B1 | * | 6/2001 | Lokuge ......................... 715/841 |
| 6,295,059 | B1 | | 9/2001 | Lentz et al. |
| 6,295,060 | B1 | * | 9/2001 | Lentz et al. ................... 715/764 |
| 6,496,208 | B1 | * | 12/2002 | Bernhardt et al. ............ 715/853 |
| 6,636,250 | B1 | | 10/2003 | Gasser |
| 6,741,268 | B1 | | 5/2004 | Hayakawa |
| 7,007,226 | B1 | * | 2/2006 | Smith et al. ................... 715/206 |
| 7,030,889 | B2 | | 4/2006 | Hamada et al. |

(Continued)

FOREIGN PATENT DOCUMENTS

| JP | 02-235095 | 9/1990 |
| JP | 05-061633 | 3/1993 |

(Continued)

OTHER PUBLICATIONS

Remco Chang et al., Wire Vis: Visualization of Categorical, Time Varying Data From Financial Transactions.

(Continued)

*Primary Examiner* — Doon Chow
*Assistant Examiner* — Conrad Pack
(74) *Attorney, Agent, or Firm* — Janaki K. Davda; Konrad, Raynes, Davda & Victor LLP

(57) ABSTRACT

A method for displaying information in a computer system having a visual display device with available display space for displaying representations of a plurality of data items, includes receiving the plurality of data items to provide received data items, and representing the received data items with abstract visual elements on the visual display device to provide displayed abstract visual elements. An interaction with a displayed abstract visual element is received to provide a selected abstract visual element in accordance with the received interaction. A data item represented by the selected abstract visual element is displayed on the visual display device in accordance with the received interaction.

18 Claims, 13 Drawing Sheets

(56) References Cited

U.S. PATENT DOCUMENTS

| | | | |
|---|---|---|---|
| 7,100,119 B2* | 8/2006 | Keely et al. | 715/776 |
| 7,143,339 B2 | 11/2006 | Weinberg et al. | |
| 7,171,625 B1 | 1/2007 | Sacchi | |
| 7,251,653 B2 | 7/2007 | Huang et al. | |
| 7,639,256 B1* | 12/2009 | Yablonski et al. | 345/440 |
| 7,900,161 B2 | 3/2011 | Nakamura et al. | |
| 2003/0128212 A1 | 7/2003 | Pitkow | |
| 2004/0085364 A1 | 5/2004 | Keely et al. | |
| 2004/0177319 A1* | 9/2004 | Horn | 715/501.1 |
| 2005/0057498 A1 | 3/2005 | Gentle | |
| 2005/0114778 A1 | 5/2005 | Branson et al. | |
| 2005/0210389 A1* | 9/2005 | Middelfart | 715/730 |
| 2005/0273730 A1* | 12/2005 | Card et al. | 715/853 |
| 2005/0289450 A1 | 12/2005 | Bent et al. | |
| 2006/0048073 A1 | 3/2006 | Jarrett et al. | |
| 2006/0059435 A1* | 3/2006 | Molesky et al. | 715/786 |
| 2006/0117273 A1 | 6/2006 | Smith et al. | |
| 2006/0174197 A1 | 8/2006 | McIntyre et al. | |
| 2006/0224979 A1 | 10/2006 | Albrecht et al. | |
| 2007/0055940 A1 | 3/2007 | Moore et al. | |
| 2007/0136286 A1* | 6/2007 | Webster | G06F 17/30064 |
| 2007/0245306 A1 | 10/2007 | Dameshek et al. | |
| 2009/0055768 A1* | 2/2009 | Chaudhri | G06F 3/0485 715/784 |
| 2009/0187815 A1* | 7/2009 | Becerra et al. | 715/212 |
| 2009/0210910 A1 | 8/2009 | Smith et al. | |
| 2009/0249203 A1 | 10/2009 | Tsuruta et al. | |
| 2009/0254866 A1* | 10/2009 | Kugle | G06F 3/0482 715/841 |

FOREIGN PATENT DOCUMENTS

| | | |
|---|---|---|
| JP | 06-035646 | 2/1994 |
| JP | 06-502732 | 3/1994 |
| JP | 10-198546 | 7/1998 |
| JP | 2000-194469 | 7/2000 |
| JP | 2001-034383 | 2/2001 |
| JP | 2002-157059 | 5/2002 |
| JP | 2004-511829 | 4/2004 |
| JP | 2007-164298 | 6/2007 |
| JP | 2008-537221 | 9/2008 |
| WO | 2008/010432 | 1/2008 |

OTHER PUBLICATIONS

Maria Bielikova et al., Adaptive Incremental Browsing of Ontology Structure.

Abstract and Machine Translation of JP Publication No. 05-061633, dated Mar. 12, 1993, 29 pp.

Abstract and Machine Translation of JP Publication No. 06-035646, dated Feb. 10, 1994, 19 pp.

Abstract and Machine Translation of JP Publication No. 10-198546, dated Jul. 31, 1998, 26 pp.

Abstract and Machine Translation of JP Publication No. 2000-194469, dated Jul. 14, 2000, 22 pp.

U.S. Pat. No. 5,283,864, dated Feb. 1, 1994, is an English language equivalent of JP Publication No. 06-502732, dated Mar. 24, 1994.

U.S. Pat. No. 6,636,250, dated Oct. 21, 2003, is an English language equivalent of JP Publication No. 2004-511829, dated Apr. 15, 2004.

U.S. Pat. No. 6,741,268, dated May 25, 2004, is an English language equivalent of JP Publication No. 2001-034383, dated Feb. 9, 2001.

U.S. Pat. No. 7,030,889, dated Apr. 18, 2006, is an English language equivalent of JP Publication No. 2002-157059, dated May 31, 2002.

U.S. Pat. No. 7,900,161, dated Mar. 1, 2011, is an English language equivalent of JP Publication No. 2007-164298, dated Jun. 28, 2007.

US Publication No. 2009/0210910, dated Aug. 20, 2009, is an English language equivalent of JP Publication No. 2008-537221, dated Sep. 11, 2008.

US Publication No. 2009/0249203, dated Oct. 1, 2009, is an English language equivalent of WO Publication No. 2008/010432, dated Jan. 24, 2008.

Information Materials for IDS, dated Dec. 13, 2013, from JP Office Action dated Dec. 3, 2013, 3 pp.

Furnas, G.W., "Generalied Fisheye Views", Bell Communications Research, © 1986 ACM 0-89791-180-6/86/0400-0016, CHI'86 Proceedings, Apr. 1986, Total 9 pp.

Rao, R. and S.K. Card, "The Table Lens: Merging Graphical and Symbolic Representations in an Interactive Focus +Context Visualization for Tabular Information", Human Factors in Computing Systems, CHI '94, Boston, Massachusetts, © 1994 ACM 0-89791-650-6/94/0318, Total 7 pp.

* cited by examiner ably difficult for users. Additionally, it can be time consuming to locate a specific data item using scrolling without additional mechanisms like searching and filtering.

DISPLAYING A REPRESENTATION OF DATA IN CONDITIONS OF LIMITED VISUAL SPACE

BACKGROUND

This invention relates generally to field of visual displays of data.

It is well known to provide visual displays of data, including partial visual displays of data, under conditions where limited space is available for the visual displays. In particular, it is known to provide partial visual displays of lists of data, and to provide techniques for accessing and displaying data in the lists that is not visible in the partial visual display.

For example, it is known to use scrolling lists to display subsets of a total list of data. Scrolling lists permit a user to view a window of a list of data, and use a mouse to move the viewing window up or down the list. Moving the window in this manner permits the user to view additional data that was not previously displayed in the available visual display space. In addition to permitting users to use a mouse to move the viewing window, it is known to permit users to use a keystroke and many other types of input devices. In some methods it is possible to use the input device to move a viewing window to the left or to the right, rather than up or down, in order to permit the visual display of additional data. However, scrolling of data can be ergonomically difficult for users. Additionally, it can be time consuming to locate a specific data item using scrolling without additional mechanisms like searching and filtering.

Another problem with scrolling list design is with selection of a range of items. If the user wants to select a range of items, it is often necessary to scroll to one item, select it, and while holding the shift key, scroll to another item and select it. When performing this procedure the entire range of the selection may not be completely visible. Therefore, the user is forced to scroll up and down on the list to ensure the desired range of items is selected.

Is also known to use paging tables to enable users to view portions of lists of data. Accordingly, data that does not fit in the available visual display space can be stored in indexed virtual memory, and accessed and displayed under the control of the user. However, paging tables can also have significant usability issues with regard to selection and manipulation of the data to be displayed. For example, paging tables can require trial and error to locate specific data items since it is often not known which pages contain the desired data. Thus, the use of paging tables can often require more time to locate data items than the use of scrolling techniques.

Thus, both scrolling and paging tables can impede arbitrary access to desired data items in a large list of data items, Therefore, scrolling and paging currently contribute significantly to negative user satisfaction in graphical user interface products.

U.S. Pat. No. 6,295,059, issued to Lentz et al. on Sep. 25, 2001, teaches a method for compressing and expanding items of information displayed to a user. The information items taught by Lentz et al. are displayed as images formed of rows of information pixels. In order to compress the images representing the information items, and to permit the display of additional images of information, varying numbers of rows of pixels forming the displayed items are omitted. In order to expand an information item that has been compressed in this manner, the information item is reconstituted by restoring the omitted rows of pixels using bitmaps of the images.

U.S. Pat. No. 7,100,119 issued to Keely et al. on Aug. 29, 2006 teaches a graphical user interfaces for computer display devices. The Keely et al. graphical user interface includes a page bar control element for allowing a user to navigate the pages of a multiple page electronic document, and/or to navigate among the pages of a plurality of different electronic documents. The page bar control element taught by Keely provides a visual representation of a plurality of pages of a document. The visual representations of the pages include a plurality of markers. The markers represent one or more pages of the document or documents. The user can view the contents of the various pages in the document by moving an input device along the page bar control element to the markers.

U.S. Patent Application Publication 2006/0048073 A1, filed by Jarret et al. on Nov. 12, 2004, teaches a system for addressing some of the ergonomic problems associated with scrolling information on a visual display. In the Janet et al. system a user uses a cursor or a panning tool to cause the displayed information to move in tandem with the cursor or tool as it is moved over the display. The cursor can be deactivated, and the displayed information continues to scroll for a user-determined period of time after the cursor is deactivated. The speed of the continued scrolling is also controllable by the user. Furthermore, the speed of the continued scrolling need not be constant during the period of continued scrolling.

SUMMARY

A method for displaying information in a computer system having a visual display device with available display space for displaying representations of a plurality of data items, includes receiving the plurality of data items to provide received data items, representing the received data items with abstract visual elements on the visual display device to provide displayed abstract visual elements, and receiving an interaction with a displayed abstract visual element to provide a selected abstract visual element in accordance with the received interaction. A data item represented by the selected abstract visual element is displayed on the visual display device in accordance with the received interaction.

The visual display device requires a display space greater than the available display space to display the received data items in an unabstracted form, and the displayed abstract visual elements required to fit the displayed abstract visual elements representing the received data items into the available display space are displayed. At least one unabstracted data item of the received data items is displayed on the available display space. A plurality of the displayed abstract visual elements are aggregated to provide an aggregated abstract visual element representing a plurality of the received data items. A level of aggregation of the aggregated abstract visual elements is selected according to the quantity of the received data items and according to the available display space. Aggregated abstract visual elements have a plurality of differing levels of aggregation. Interacting with an aggregated abstract visual element having a first level of aggregation selects an aggregated abstract visual element having a second level of aggregation differing from the first level of aggregation.

The selected abstract visual element is unselected in accordance with a further interaction. A further received data item represented by a displayed abstract visual element is displayed separated from the selected abstract visual element by a selected quantity of displayed abstract visual elements. The selected quantity of displayed abstract visual elements is varied. A further display space is made available on the visual display device in accordance with the received interaction, wherein the further display space is a pop up box and a further displayed abstract visual element is displayed in the pop up box. The further displayed abstract visual element is selected in response to a further interaction with the further displayed abstract visual element to display a data item of the received data items represented by the further displayed abstract visual element. An aggregated abstract visual element is displayed on the further display space. A further aggregated abstract visual element having a level of aggregation differing from the level of aggregation of the aggregated abstract visual element is provided in accordance with an interaction with the aggregated abstract visual element.

Additionally, a computer system for displaying information having a visual display device with available display space for displaying representations of a plurality of data items, includes received data items of the plurality of data items, displayed abstract visual elements representing the received data items on the visual display device, a received interaction with a displayed abstract visual element to provide a selected abstract visual element in accordance with the received interaction, and a displayed data item represented by the selected abstract visual element and displayed on the visual display device in accordance with the received interaction. It also includes at least one unabstracted data item of the received data items displayed on the visual display device, and an aggregated abstract visual element representing a plurality of the received data items. The level of aggregation is selected in accordance with the quantity of the received data items, and the selected abstract visual element is unselected in accordance with a further interaction.

The system and method of the present invention can represent the data items of a list of data items on a visual display device. Many, or even all of the data items, can be represented as abstract visual elements or display zones that are abstractions of the represented data items. When a user interacts with an abstract visual element or display zone, the system and method of the invention can reveal the data item it represents. The abstractions representing the data items can be smaller than the data items themselves. Thus, all of the data items of a list can be represented on a visual display such as a screen without scrolling or paging of the data items on the list in order to access and display any arbitrary data item.

DETAILED DESCRIPTION

Figure 1:
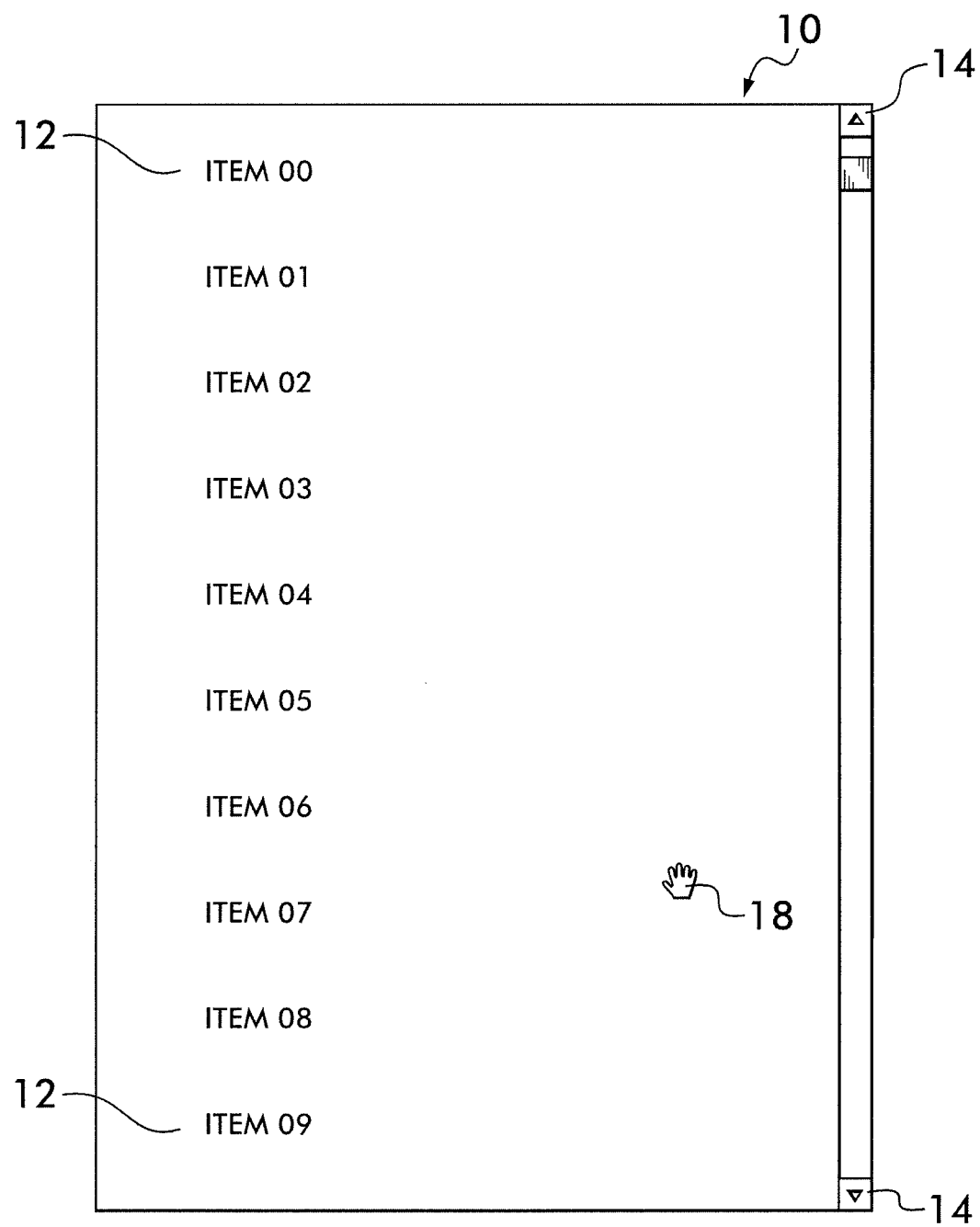
FIG. 1 shows a schematic representation of a prior art scrolling list for displaying data items.

Referring now to FIG. 1, there is shown the prior art scrolling data item list 10. The scrolling data item list 10 is a partial list of data items 12 that can be displayed on a visual display device, wherein the total list of data items 12 is too large for simultaneous display on the display device. The total list of data items 12 can include any number of data items 12. For example, the total list of data items 12 displayed in the scrolling data item list 10 for illustrative purposes can include one hundred data items 12. The one hundred data items in the illustrative example can be identified as Item 00 starting at the beginning, or top, of the total list, to Item 99 at the end, or bottom, of the total list.

While as many data items 12 as display space permits can be displayed at one time in general using the scrolling data item list 10, only ten data items 12 of the total list are shown at a time in the illustrative example. The ten data items 12 displayed by the scrolling data item list 10 can be identified as Items 00 to Item 09. Using conventional scrolling techniques the remaining data items 12 can be displayed using the scrolling data item list 10. While the data items 12 shown in the scrolling data item list 10 are located at the top of the total list of data items 12, the scrolling data item list 10 can show data items 12 at any location in the total list when scrolled. For example, the scrolling data item list 10 can show data items 12 located anywhere in the middle of the total list, or at the end of the total list.

A user can use any of the well known scrolling techniques to cause the scrolling data item list 10 to scroll up or down in order to display the additional data. For example, the user can use a mouse, a tab key, arrows or any other keystroke to scroll the scrolling data item list 10. Additionally, the user can use the cursor 18 on the up or down arrows 14 to perform the scrolling operations of the scrolling data item list 10. Furthermore, any other input device can be used to scroll the scrolling data item list 10.

As well understood by those skilled in the art, if the scrolling data item list 10 is scrolled down, the data item 12 that is labeled Item 00 can disappear off of the top of the scrolling data item list 10. A new data item 12, not visible in the list 10 as shown, can appear at the bottom. If the scrolling data item list 10 displays data items 12 that are not located at the top of the total list, the scrolling data item list 10 can be scrolled up. If it is scrolled up, the data item 12 at the bottom of the scrolling data item list 10 can disappear off of the bottom of the list 10, and a new data item 12 can appear at the top. In this manner a list of data items 12 having substantially any length can be displayed to the user under the control of the user. However, in many cases the data item 12 the user is searching for is not displayed, and the user may not know where in the off-screen data the desired data item 12 is located. Thus, the search for the desired data item 12 can be slow and tedious.

Figure 2A:
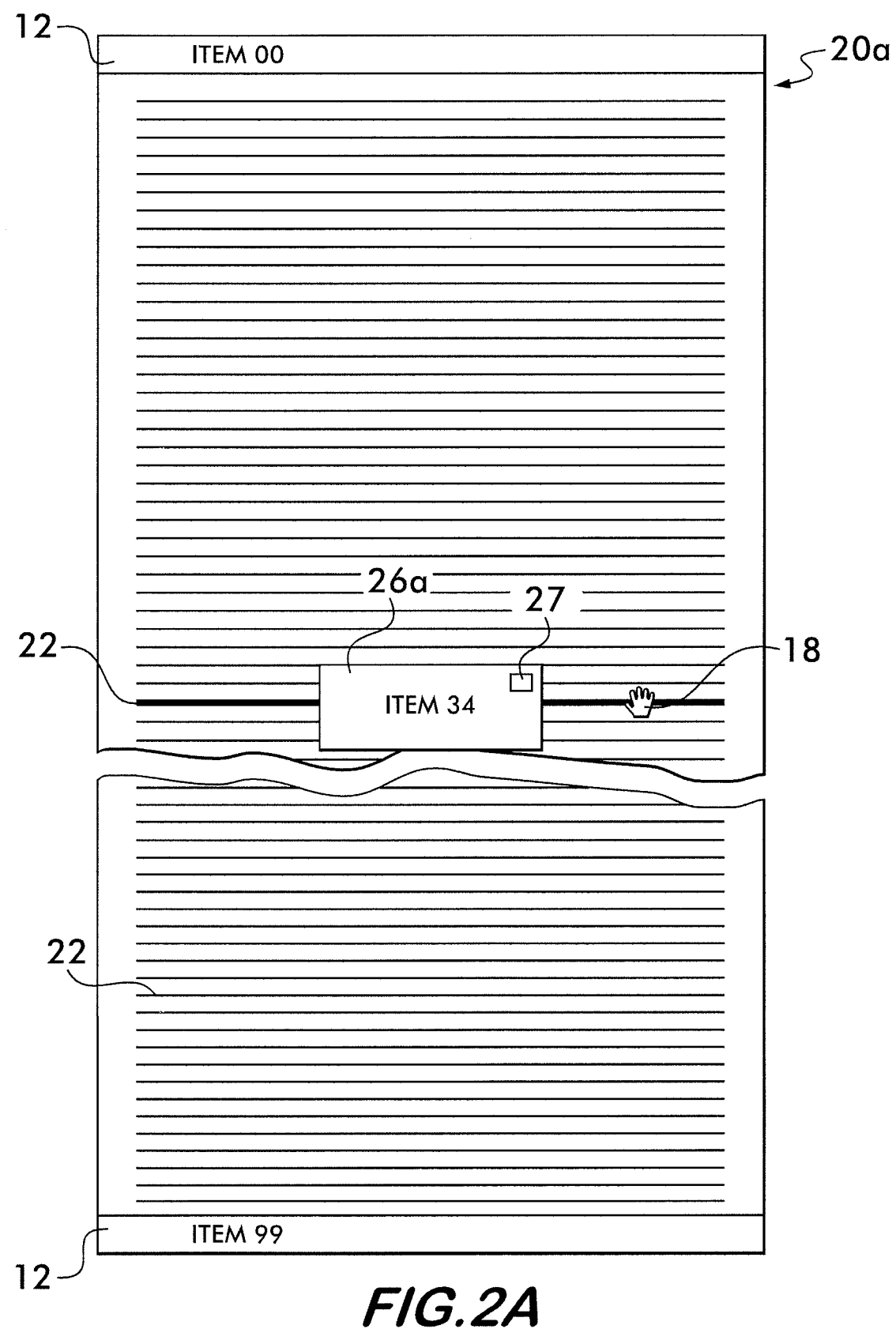
FIGS. 2A-2E shows schematic representations of alternate embodiments of the abstracted data item list of the present invention.

Referring now to FIG. 2A, there is shown an embodiment of the abstracted data item list 20a of the present invention. The abstracted data item list 20a can display a list of data items 12 of any length whatsoever. In the example used herein, for illustrative purposes only, the abstracted data item list 20a can represent a predetermined total list of one hundred data items 12. According to a preferred embodiment of the invention, the first data item 12 of the total list, identified as Item 00, can be displayed in text form at the top of the abstracted data item list 20a. The last data item 12 of the total list, identified as Item 99, can be displayed in text form the bottom of the abstracted data item list 20a. The remaining data items 12 of the total list of data items 12 can be represented by abstract visual elements 22 in the abstracted data item list 20a. The abstract visual elements 22, representing the remaining individual data items 12, can also be referred to as interactive visual elements 22 or display zones 22.

The abstract visual elements 22 are abstractions that can represent any number of remaining data items 12 between the first and last data items 12 that may exist in a total list. Thus, the abstracted data item list 20a can display representations of all of the data items 12, simultaneously, on a display device where there is insufficient display space to show the data items 12 in their unabstracted forms. The abstracted data item list 20a can represent the total list of data items 12 in this manner because almost all of the data items 12 are represented by abstract visual elements 22 requiring less display space than the unabstracted forms of the data items 12.

The abstractions representing the data items 12 can be any type of abstractions useful for representing the data items 12. For example, the abstract visual elements 22 can be lines, as shown in the abstracted data item list 20a, or bars. The abstract visual elements 22 can also be symbols such as triangles, dots, ovals, trapezoids or any other shapes or images that can be displayed on a computer screen and accessed with either a keyboard, a mouse or any other input device used for selection. The size of the abstract visual elements 22 can be selected according to the quantity of data items 12 to be represented and the display space available. If the quantity of data items 12 to be displayed is permitted to change during the display, the abstract visual elements 22 can be altered accordingly. Although human readable symbols can be used, in a preferred embodiment of the invention, the abstract visual elements 22 can be symbols that are non-readable abstractions.

Thus, in one preferred embodiment of the invention, the abstracted data item list 20a can be rendered with the data of the first and last data items 12 fully visible, for example in a text-readable form. The remaining data items 12 can be represented in the abstracted data item list 20a by abstract visual elements 22 rendered as abstractions which are not human readable, such as non-text lines or bars. In another embodiment, all of the data items 12 in the abstracted data item list 20a can be represented as abstract visual elements 22, rather than displaying the first and last data items 12 in unabstracted forms. Furthermore, in another embodiment, any number of selected data items 12 at any different locations in the total list of the data items 12 can be unabstracted. The display of all of the data items 12 on screen at the same time, either in abstracted or unabstracted forms, facilitates the efforts of the user to locate the desired data items 12. The abstractions used as abstract visual elements 22 can be symbols that do not normally represent any data items 12, or even any meaning whatsoever, to the user. When the symbols used as abstract visual elements 22 do not have to be read and associated with any instance of any information or any application to any particular object, the usability of the invention is increased by reducing the cognitive load on the user.

In order to determine which data item 12 an abstract visual element 22 in the abstracted data item list 20a represents, the user can interact with the abstract visual element 22 to expand it. The interaction with the abstract visual element 22 can be, for example, hovering the mouse cursor 18 over the element 22, clicking a mouse or hitting the return key while hovering over the element 22, tabbing to the element 22, or any other method known to those skilled in the art.

For example, interacting with an abstract visual element 22 representing Item 34 of the abstracted data item list 20a can cause the pop up box 26a to appear and display the human readable text form of Item 34. Any other interactive visual item 22 in the abstracted data item list 20a can be selected and expanded in the same manner, by interacting with its abstract visual element 22. Interaction with a new abstract visual element 22 can cause the previously selected abstract visual element 22 to return to its abstracted form. Thus, a user can find desired data items 12 in the abstracted data item list 20a by moving the cursor 18 along the abstract visual elements 22, selecting and unselecting the abstract visual elements 22, and viewing the expanded data items 12 in the resulting pop up boxes 26a. Furthermore, a user can select an abstract visual element 22, and leave it selected while selecting one or more other elements 22. Each element 22 can be unselected individually, or plural elements 22 can be unselected at the same time.

The pop up box 26a can be located on the display of the abstracted data item list 20a superimposed over at least portions of some of the abstract visual elements 22. It can also be located in the vicinity of the list 20a, or at any other convenient location. For example, the pop up box 26a can be displayed as a panel adjacent the abstracted data item list 20a. If the data item 12 represented by an abstract visual element 22 is too long to be conveniently displayed in a pop up box 26a, the pop up box 26a can display a shortened version of the data item 12. Additionally, the system and method of the invention can display a shortened version of a data item 12, rather than a full version, for any other reasons. The shortened version can be an abbreviation, an acronym, a truncated version of the represented data item 12, a digested version, a title, or any other type of shortened version.

If a shortened version of a data item 12 is displayed in a pop up box 26a, any further interaction can be defined for accessing the full version. The further interaction can be defined to be a click on the expanded abstract visual element 22, a click on the pop up box 26a, hovering over the pop up box 26a for longer than a predetermined period of time, a click on an expansion icon such as the icon 27 that can be provided on the pop up box 26a, or any other user interaction. Additionally, the pop up box 26a can contain one or more links to the data items 12 or to any other information. Furthermore, the expanded versions of the selected data items 12 can contain any number of further icons 27 or further links which can be used for any other purposes. In this manner it is possible to follow a linked list of data, or to drill down to any number of levels of data, by way of the selected data items 12.

If an icon 27 or a link is provided for accessing an expanded version of a selected data item 12, it need not be located on the pop up box 26a. It can be located at any convenient location. Additionally, when the expanded version is displayed, an icon 27 can be provided for switching back to the shortened version of the data item 12.

As previously described, when a user is finished viewing the expanded form of the abstract visual element 22, the pop up box 26a can disappear in response to another user interaction. For example, in different embodiments of the invention, the pop up box 26a can disappear in response to moving the cursor 18 away from the expanded abstract visual element 22, or in response to clicking again on the expanded abstract visual element 22. It can also disappear in response to clicking on the pop up box 26a itself or in response to clicking on another abstract visual element 22.

Additionally, the icon 27 provided on the pop up box 26a can be used for unselecting the pop up box 26a in order to close the pop up box 26a. In one embodiment of the invention, plural icons 27 can be provided on the pop up box 26a in order to allow convenient closing out or expansion of pop up boxes 26a. Additional icons 27 can be provided on the pop up box 26a for any other purposes if convenient.

In one preferred embodiment of the invention, the interactions used for controlling the operations of the abstracted data item list 20a can be the same as or similar to the interactions commonly used for controlling the scrolling of the prior art scrolling data item list 10. This can make it easier for users to use the abstracted data item list 20a since the users will be very familiar with scrolling operations. Furthermore, in a preferred embodiment, the system and method of the invention can be used in parallel with a method such as the prior art scrolling data item list 10, a paging method, or any other method for a partial display of data that is too large for a complete display, by switching between the different methods.

Figure 2B:
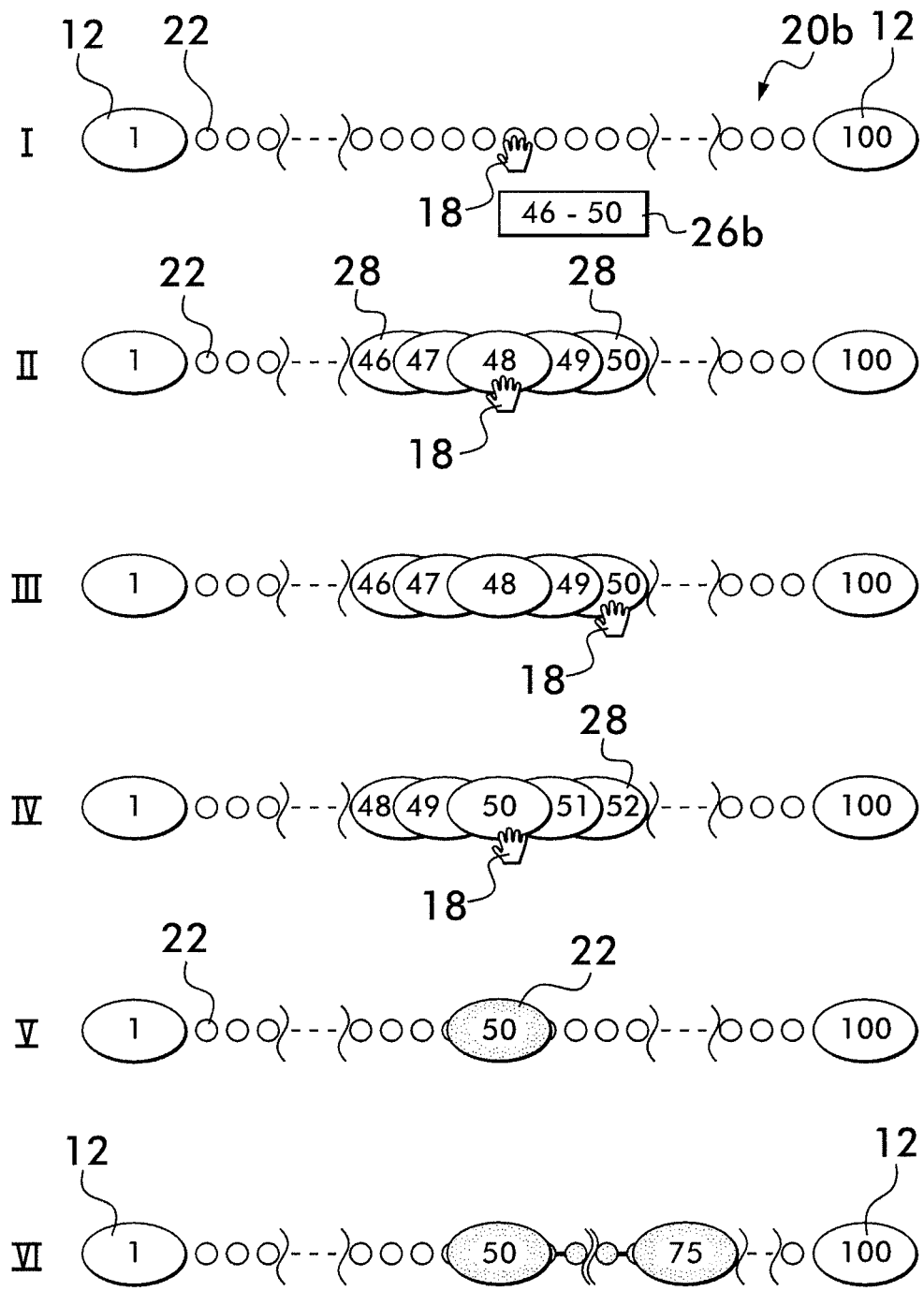
Figure 2C:
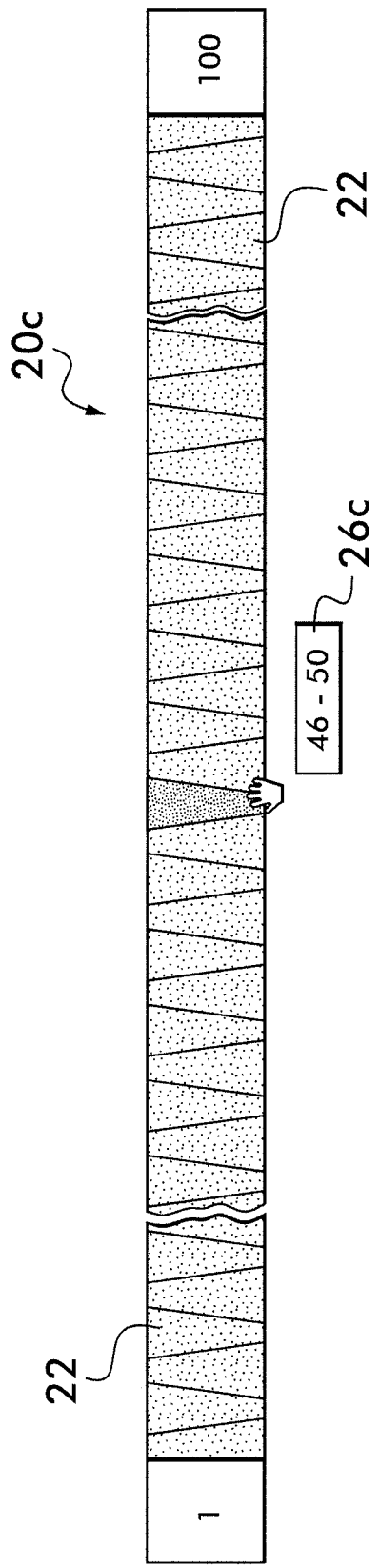
Figure 2D:
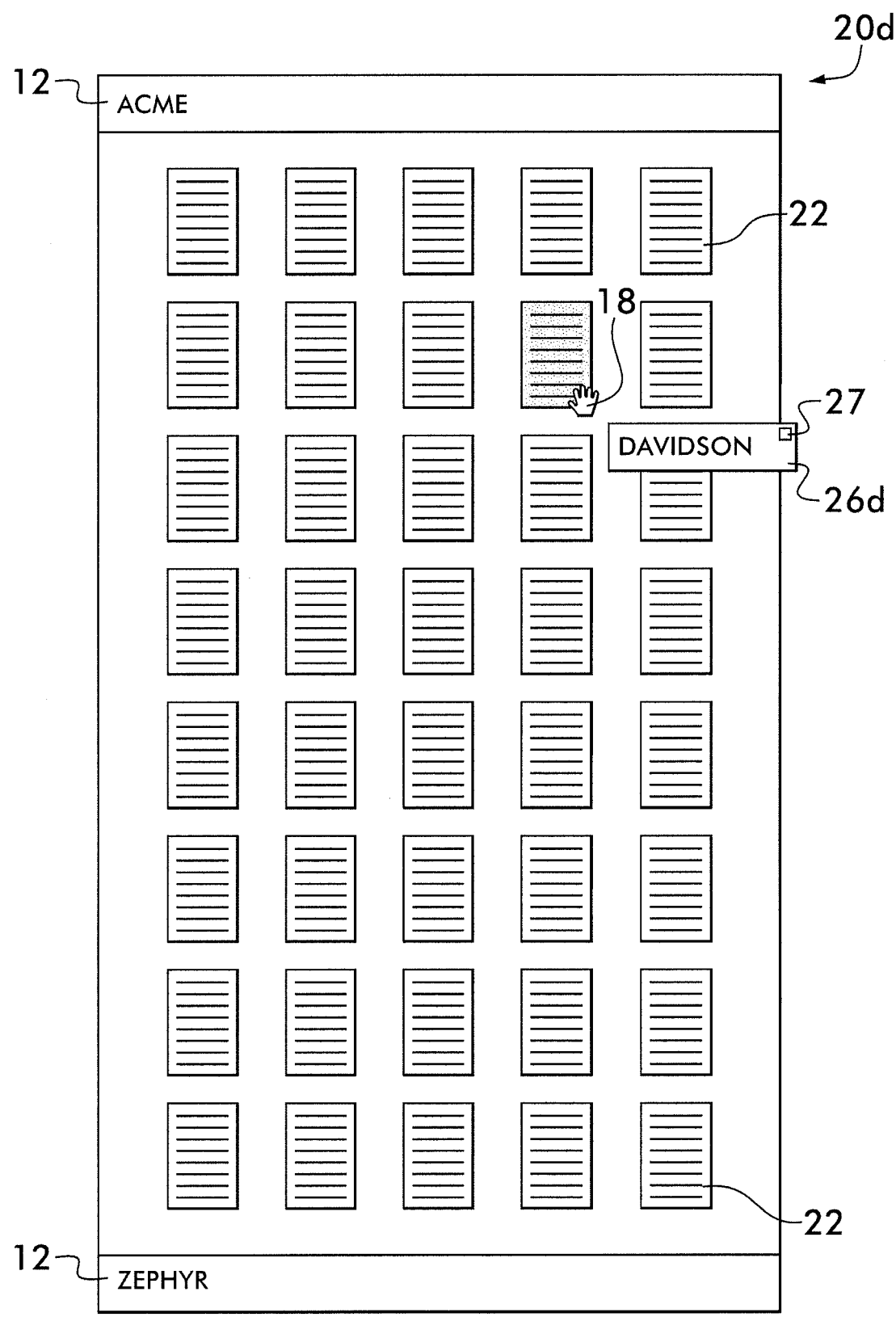
Figure 2E:
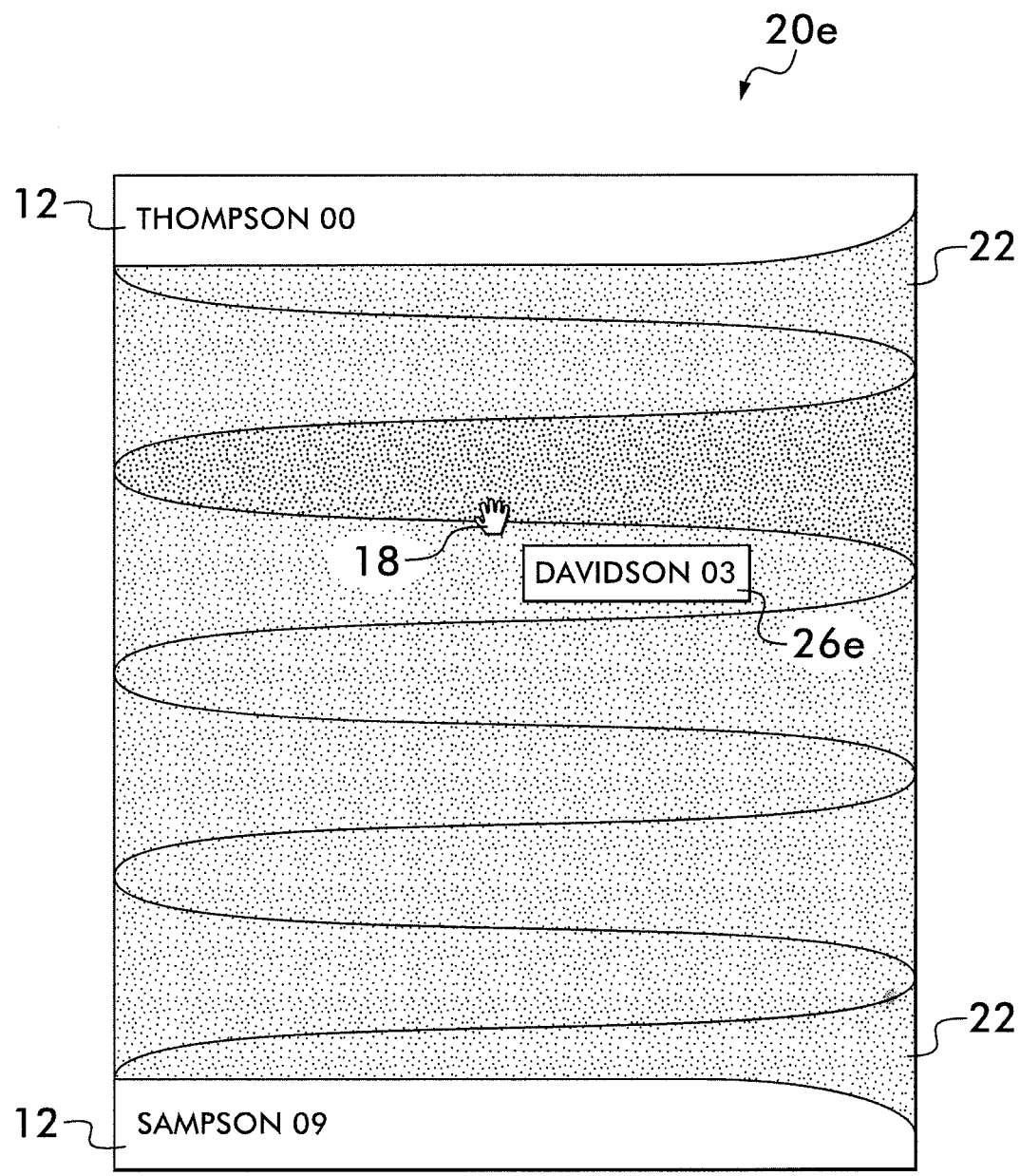

Referring now to FIGS. 2B-2D, there are shown the abstracted data item lists 20b-d. The abstracted data item lists 20b-d are alternate embodiments of the abstracted data item list 20a and are shown as examples for illustrative purposes only.

Six representations of the abstracted data item lists 20b are shown, each representing one-hundred data items 12. The data items 12 represented by the abstracted data item lists 20b can be the same ones represented by the abstracted data item list 20a, or any other one hundred data items 12. Alternately, they can represent any other number of data items 12. The six representations of the abstracted data item lists 20b are labeled as List I through List VI. In List I of the abstracted data item lists 20b, the abstract visual elements 22 representing the data items 12 are dots or circles, wherein each dot or circle can represent a single data item 12. An expanded representation of Item 46 through Item 50 can be displayed in a pop up box 26b when the cursor 18 hovers over and selects Item 48. In List II the selected data items 12 of Item 46 through Item 50 can be represented by abstract visual elements 22 shaped as ovals.

As shown in List III the cursor 18 can be moved from Item 46 to Item 50 in order to select Item 50. When the cursor 18 hovers over Item 50 in this manner, Item 48 to Item 52 can be selected and displayed as ovals, as shown in List IV. Note that List IV can be automatically recentered after Item 50 is selected if desired. Alternately, it can be recentered in response to a request by the user, or it can be displayed off-center. The selected Item 50 can also be represented as a highlighted oval as shown in List V. In one preferred embodiment, the user can simultaneously select Item 50 through Item 75, as described in more detail below. The selection of a range of data items 12 can be performed, for example, by dragging the cursor 18 over the data items 12, using the control key or the shift key, or any other method.

The abstractions shown in the abstracted data item list 20c can also be used to represent the one-hundred data items 12 represented by lists such as the abstracted data item lists 20a,b. In the abstracted data item list 20c the data items 12 can be represented by frustoconical shapes, and the expanded Item 46 through Item 50 can be displayed in a pop up box 26c.

In the abstracted data item list 20d rectangular icons are arranged in multiple rows to represent alphabetically arranged data items 12 ranging from Acme to Zephyr. Thus, the abstract visual elements 22 of the invention can be arranged both horizontally and vertically in the same list. Furthermore, the abstract visual elements 22 can be arranged in any other direction in an available display space. The cursor 18 is used to select Davidson for display in the pop up box 26d.

The abstracted data item list 20e the cursor 18 selects a data item 12 for display in a pop up box 26e includes data items 12 ranging from Thompson 00 to Sampson 09. The cursor 18 selects Davidson 03 for display in a pop up box 26e. Thus, it will be understood that the data items 12 represented by the abstractions of the present invention need not be in any sequential order, and can, in fact, be any random collection of data items 12 in any order.

Figure 3:
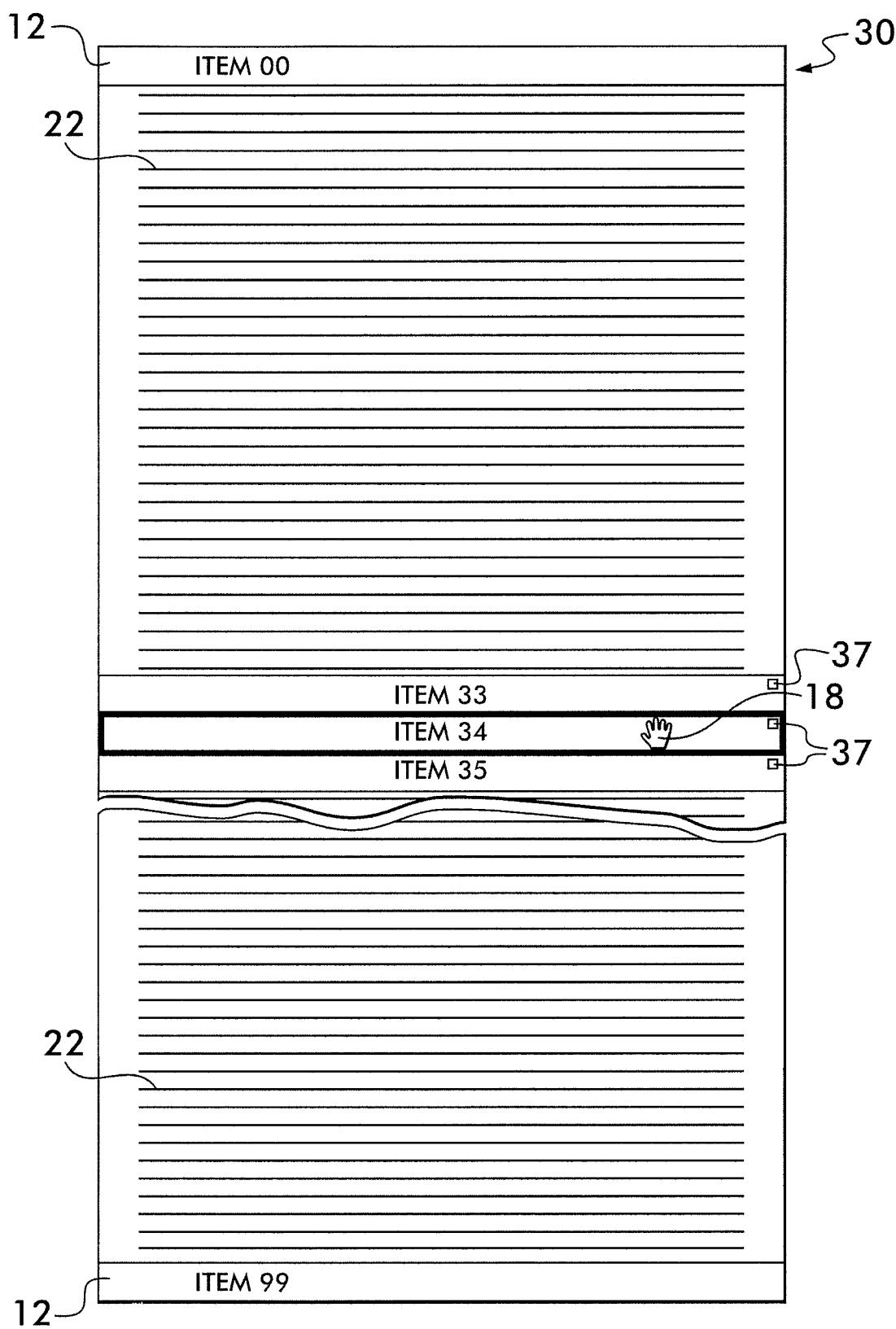
FIG. 3 shows a schematic representation of an alternate embodiment of the abstracted data item list of the present invention.

Referring now to FIG. 3, there is shown the abstracted data item list 30. The abstracted data item list 30 is an alternate embodiment of the abstracted data item list 20a, wherein each abstract visual element 22 represents one of a total of one hundred data items 12. In the abstracted data item list 30, an abstract visual element 22 can be selected using any type of interaction, as previously described with respect to selecting the abstract visual elements 22 of the abstracted data item list 20a. However, in the abstracted data item list 30, the selection of an abstract visual element 22 can cause an expansion of the abstract visual elements 22 immediately before and immediately after the selected abstract visual element 22, as well as the selected abstract visual element 22.

For example, the selection of the abstract visual element 22 corresponding to Item 34 can cause Item 33 and Item 35 to be expanded and displayed in a bar format along with the selected Item 34. This can assist the user in finding a desired data item 12 by providing more of a context for a selected data item 12, and by helping the user determine which direction to move in order to locate a desired data item 12. The selected Item 34 can be rendered heavier or in a different color than Item 33 or Item 35, to indicate more clearly to the user that it is selected. Additionally, Item 34 can be larger or different in any other way in order to indicate that it is the selected data item 12.

While the display of Item 33, Item 34 and Item 35 are shown in-line with the list of the abstract visual elements 22 in the abstracted data item list 30, the display can be provided as a pop up box, such as the pop up box 26a as previously described. The display of a pop up box showing the expanded data items 12 can also be provided at some location other than over the abstracted data item list 30. For example, the display can be provided in a panel adjacent to the abstracted data item list 30, or elsewhere on the visual display device. Additionally, it can be dragged from one location to another.

Furthermore, one or more icons 37 or links can be provided on any of the expansion bars of the abstracted data item list 30 for closing them out or for further expanding them, or for any other purpose. Additionally, in one embodiment of the invention the user can select the quantity of data items 12 in the vicinity of the selected data item 12 that are displayed in an expanded form. Furthermore, the quantity of expanded data items 12 can be altered by the user while the selected data item 12 is still selected.

Figure 4:
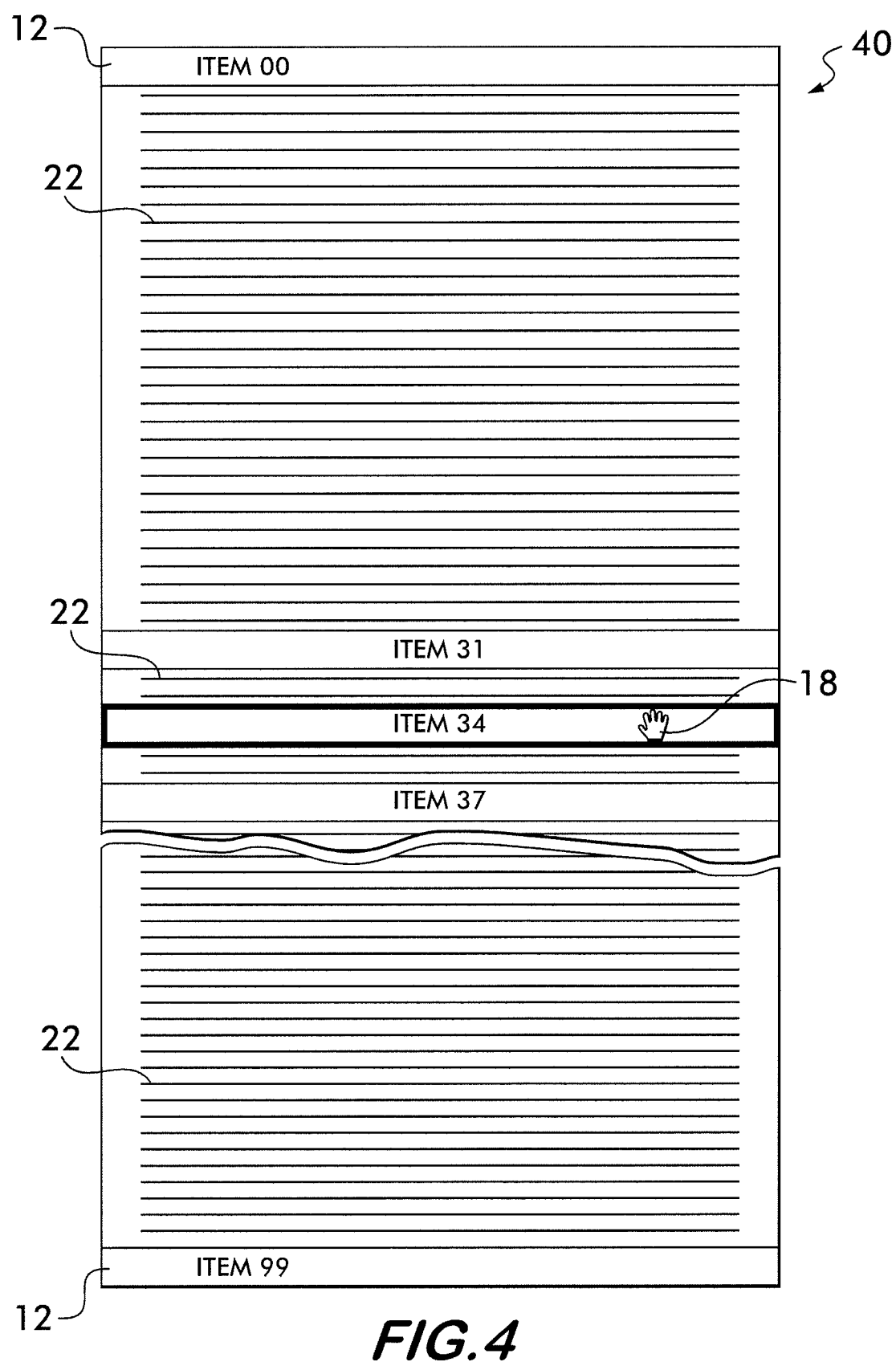
FIG. 4 shows a schematic representation of an alternate embodiment of the abstracted data item list of the present invention.
Figure 5A:
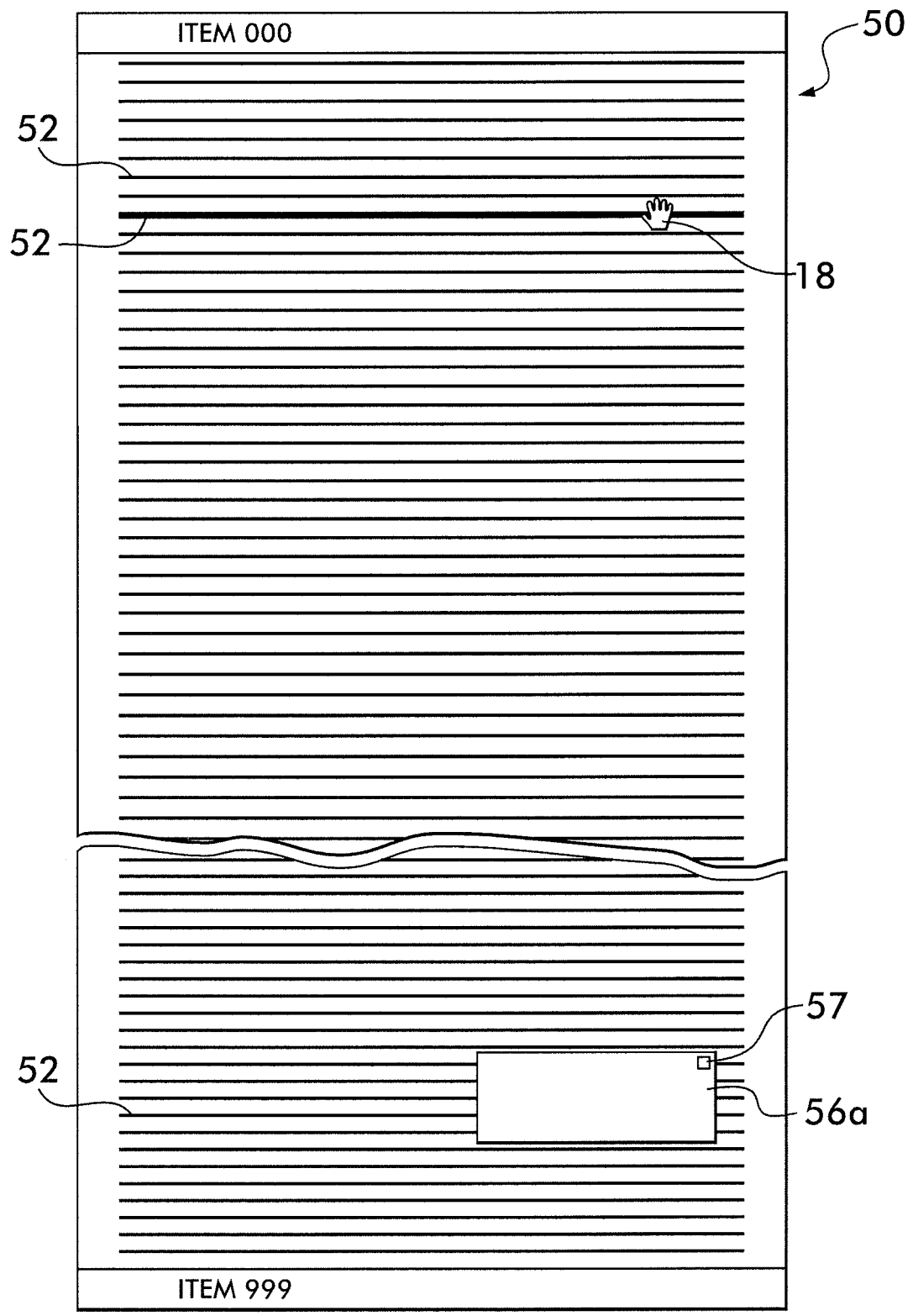
FIG. 5A shows a schematic representation of an alternate embodiment of the abstracted data item list of the present invention.
Figure 5B:
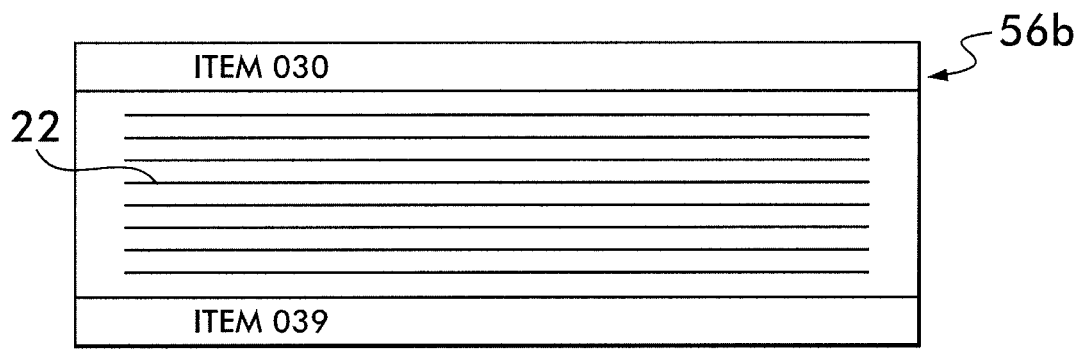
FIGS. 5B-D show alternate embodiments of a pop up box suitable for use with the embodiment of the abstracted data item lists of the present invention.
Figure 5C:
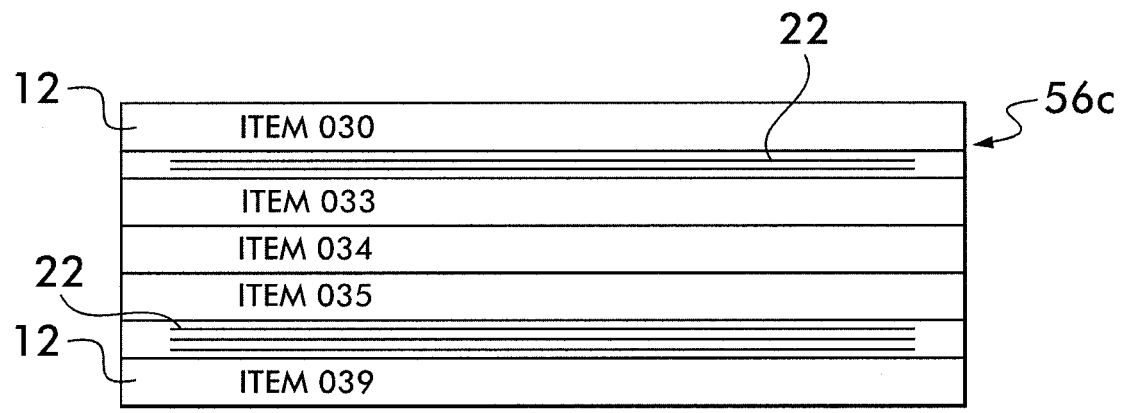
Figure 5D:
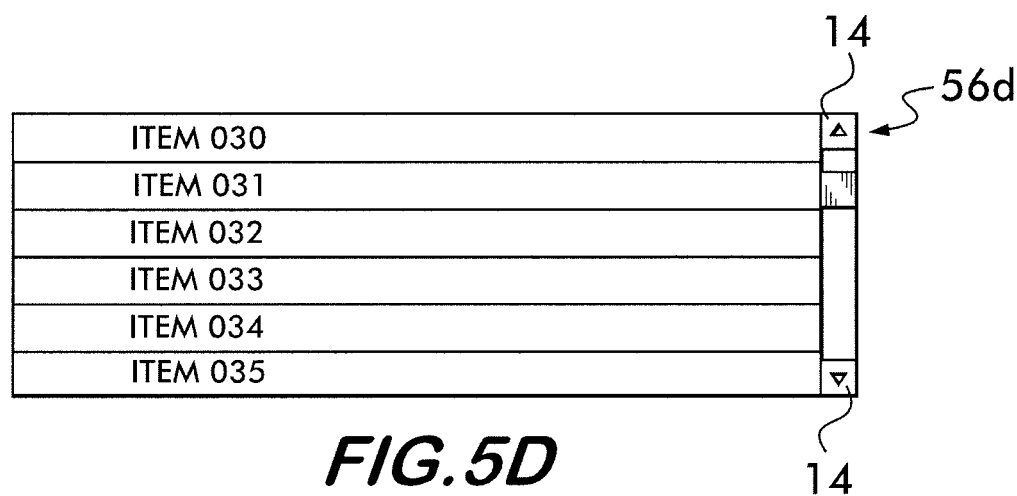

Referring now to FIG. 4, there is shown the abstracted data item list 40. The abstracted data item list 40 is another alternate embodiment of the abstracted data item list 20*a*. In the abstracted data item list 40, an abstract visual element 22 can be selected using any interaction as previously described with respect to selecting the abstract visual elements 22 of the abstracted data item list 20*a*. However, in the abstracted data item list 40 the selection of an abstract visual element 22 can cause an expansion of the abstract visual elements 22 located a predetermined number of elements 22 before and after the selected element 22. The data items 12 between the selected data item 12 and the other expanded data items 12 can continue to be represented by abstract visual elements 22. The number of intervening data items 12 between the expanded data items 12 can be varied by the user while the data items are expanded. Features such as these can assist the user in finding a desired data item 12 by providing more of a context for a selected data item 12 and by giving a sense of how compressed the abstract visual elements 22 are.

For example, selection of the abstract visual element 22 corresponding to Item 34 in the abstracted data item list 40 can cause Item 31 and Item 37 to be expanded and displayed in addition to Item 34. The abstract visual elements 22 between the displayed and expanded abstract visual elements 22 can be shown in the same manner as the rest of the abstract visual elements 22. During the time the data items 12 are expanded, the abstract visual elements 22 between them can be selected in the same manner as any other abstract visual element 22.

Two abstract visual elements 22 are shown between the first expanded abstract visual element 22 and the selected abstract visual element 22 in the abstracted data item list 40 for illustrative purposes. Additionally, two abstract visual elements 22 are shown between the selected abstract visual element 22 and the last expanded abstract visual element 22. However, some or all of the abstract visual elements 22 between the expanded abstract visual elements 22 can be omitted if convenient. Furthermore, the number of abstract visual elements 22 shown immediately before and after the selected data item 12 can be varied, and they need not be the same as each other.

In one embodiment all data items 12 between Item 31 and Item 37 can be shown in a text/human readable form so that the user can easily select the desired item. The range of data items 12 displayed simultaneously can be equivalent to the error rate for a user targeting the list. For example, if there were one thousand data items 12 on a list and the average user could drop the cursor 18 in a range near the desired element +/− ten data items 12, then a pop up/overlay should display at least ten data items 12 on either side of a selected data item 12. This range can be tested and adjusted by the user. Using an error range in this manner increases the chance that a click is correct because the desired data element 12 is likely to be somewhere within the popup/overlay that is displayed.

Referring now to FIGS. 5A-D, there are shown embodiments of the abstracted data item list 50 of the present invention. The abstracted data item list 50 is another alternate embodiment of the abstracted data item list 20*a*, which can display a list of data items 12 of any length whatsoever. However, in the example used herein, for illustrative purposes only, the abstracted data item list 50 can represent a total list of one thousand rather than one hundred data items 12. According to a preferred embodiment of the invention, the first data item 12 of the total list, identified as Item 000, can be displayed in text form at the top of the abstracted data item list 50. The last data item 12 of the total list, identified as Item 999, can be displayed in text form at the bottom of the abstracted data item list 50. The remaining data items 12 of the total list of data items 12 can be represented by abstractions in the abstracted data item list 50.

However, in order to manage the larger number of data items 12 in the total list displayed by the abstracted data item list 50, a corresponding large number of abstract visual elements 22 can be too numerous to be displayed individually. Thus, the abstract visual elements 22 can be aggregated to form the aggregated abstract visual elements 52. In general, the number of individual data items 12 represented by a single aggregated abstract visual element 52 can depend on the number of data items 12 in the total list, and the amount of space available for the display. In the example of the abstracted data item list 50 shown, each aggregated abstract visual element 52 is an abstraction that can represent ten data items 12 in the total list of data items 12. However, in other embodiments any number of data items 12 can be aggregated and represented by a single abstract visual element 52.

When the user interacts with an aggregated abstract visual element 52, a pop up box 56*a* can appear over the abstracted data item list 50 or at any other location. The pop up box 56*a* is shown as a blank pop up box 56*a* in the abstracted data item list 50. The blank pop up box 56*a* can represent any kind of display space, as described in more detail below. Thus, the pop up box 56*a* can provide any type of display space that can be made available for an expanded view of the data items 12 represented by a selected aggregated abstract visual element 52. Additionally, the user can move the cursor 18 onto a pop up box 56*a* and select any of the data items 12 displayed therein for further expansion.

The aggregated abstract visual elements 52 in the abstracted data item list 50 can be selected in any manner, as previously described with respect to the selection of the abstract visual elements 22. Additionally, the pop up box 56*a* can display the data items 12 corresponding to the selected aggregated abstract visual element 52 in any manner. For example, all of the represented data items 12 represented by the selected aggregated abstract visual element 52 can be expanded if there is enough display space in the pop up box 56*a*. Additionally, the first and last data items 12 of the selected aggregated abstract visual element 52 can be expanded, as shown in the pop up box 56*b*. In this case the data items 12 between the first and last data items 12 can be represented by the abstract visual elements 22. If there are too many abstract visual elements 22 to display in the available space, the aggregated abstract visual elements 52 can be used, or interactive elements with other levels of aggregation can be used.

Additionally, adjacent data items 12 can be expanded and displayed, as shown in the pop up box 56*c*, wherein the data items 12 adjacent the selected data item 12 are expanded. The data items 12 of the aggregated abstract visual element 52 can even be displayed as a scrolling data list with scrolling controls if convenient, as shown in the pop up box 56*d*.

In a preferred embodiment of the invention the user can be permitted to switch between the various methods for displaying the data items 12 represented on the pop up box 56a, such as the various methods shown in the pop up boxes 56b,c,d. A number of icons 57 can be provided for switching between the various methods for displaying the data items 12. Furthermore, in a preferred embodiment of the invention, pop up boxes such as the pop up boxes 54b-d can be dragged up along the length of the abstracted data item list 50 to select and unselect different aggregated abstract visual elements 52. This can permit the user to repeatedly select and unselect different data items 12 represented by the selected abstract visual elements 52. Those skilled in the art will understand that it is possible to use other methods to expand and display the different data items 12 along the abstracted data item list 50, for example, the user can use the up or down arrows on the keyboard.

Aggregated abstract visual elements at intermediate levels of aggregation can be selected using a mouse or any other device to expand the display to the next lower level of aggregation. Thus, it is possible to drill down from the highest level of aggregation, through the intermediate levels, to the individual abstract visual elements 22, and, therebelow, to the expanded data items 12 by interacting with the visual display elements at each level. In a preferred embodiment of the invention, the pop up boxes for the intermediate levels of abstraction can remain selected and dragged to different locations in order to make them visible simultaneously.

Figure 6:
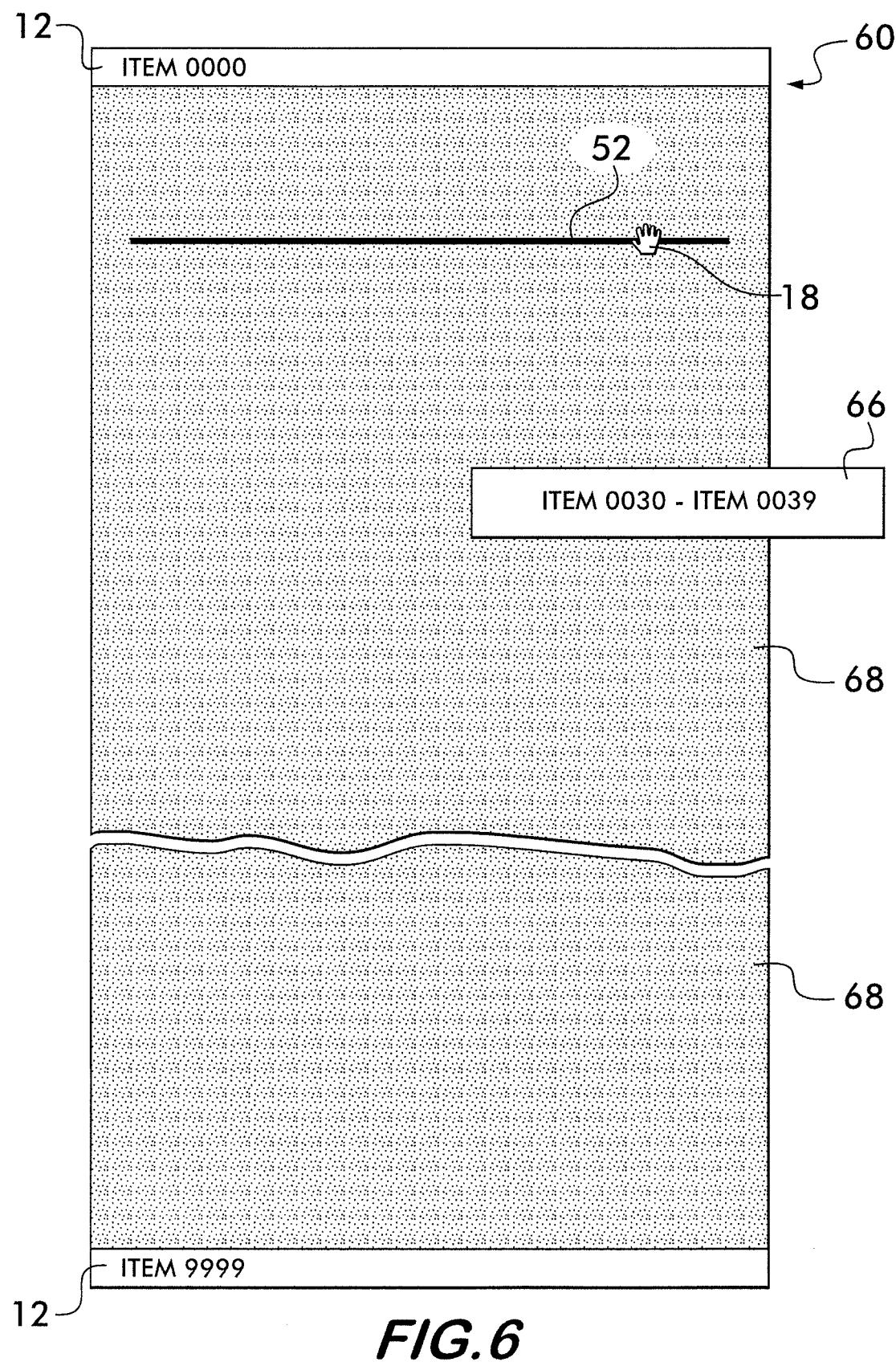
FIG. 6 shows a schematic representation of an alternate embodiment of the abstracted data item list of the present invention.

Referring now to FIG. 6, there is shown the abstracted data item list 60. The abstracted data item list 60 is an alternate embodiment of the abstracted data item list 50. In the abstracted data item list 60 a larger number of data items 12 can be represented. For example, ten thousand data items 12 labeled Item 0000 through Item 9999 can be represented by the abstracted data item list 60. Because of the large number of data items 12 represented by the abstracted data item list 60, the abstractions representing the data items 12 can merge to produce a field 68. Accordingly the field 68 can be understood to comprise a plurality of abstractions merged into a representation as a field 68. Movement of the cursor 18 along the vertical dimension of the field 68 can select an aggregated abstract visual element 52, and the corresponding data items 12 can be displayed in a pop up box 66, as previously described. The tab key or any other method may also be used to select the data items 12 represented by the field 68.

Additionally, the differing data items 12 represented by the abstracted data item list 60 need not be represented along the vertical dimension of the abstracted data item list 60. For example, merged locations along the horizontal dimension or in rows and columns can correspond to Items 0000 through Item 9999. Furthermore, it will be understood that any of the embodiments of the present invention can include abstractions representing data items 12 arranged on a display in any direction.

Figure 7:
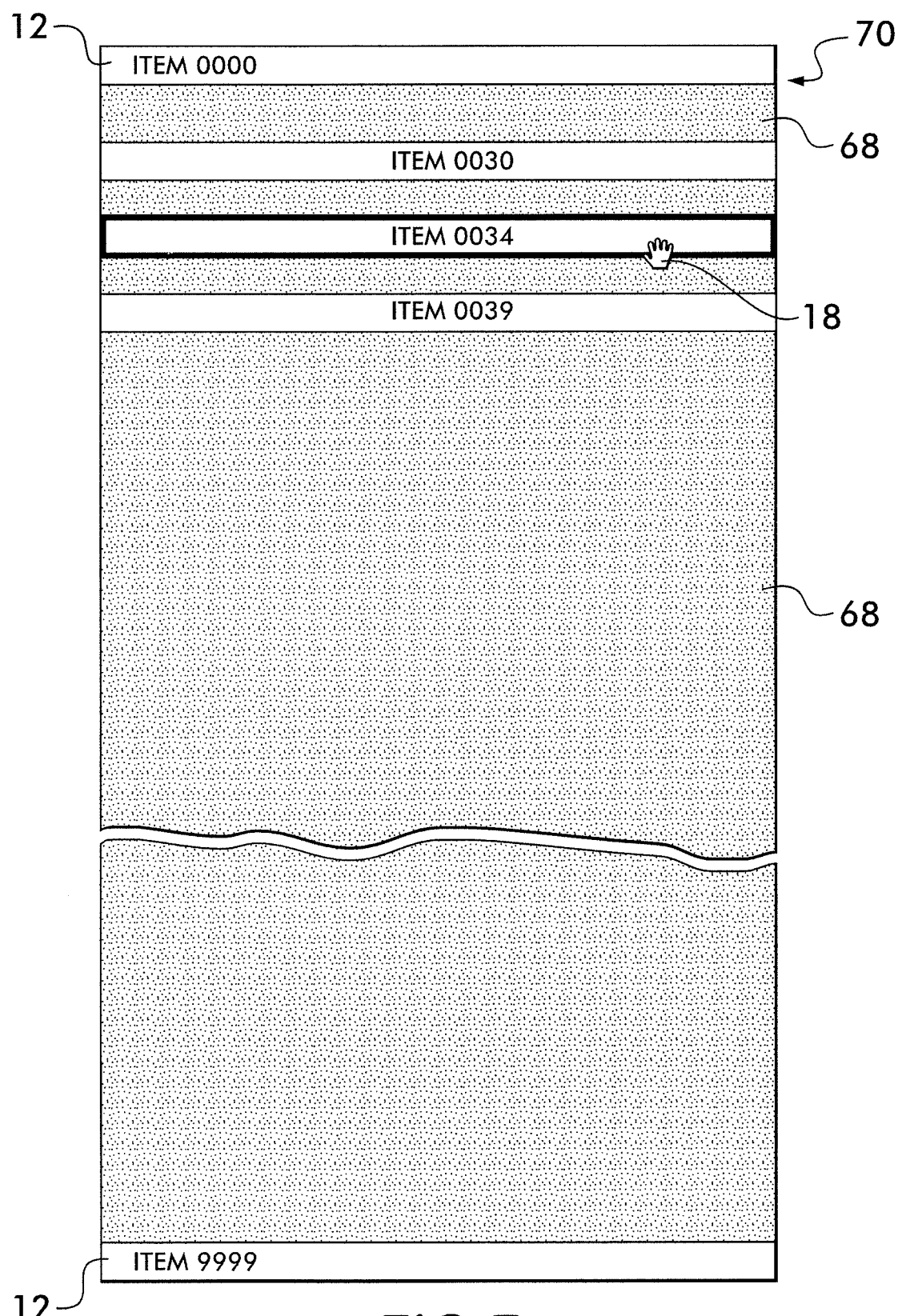
FIG. 7 shows a schematic representation of an alternate embodiment of the abstracted data item list of the present invention.
Figure 8:
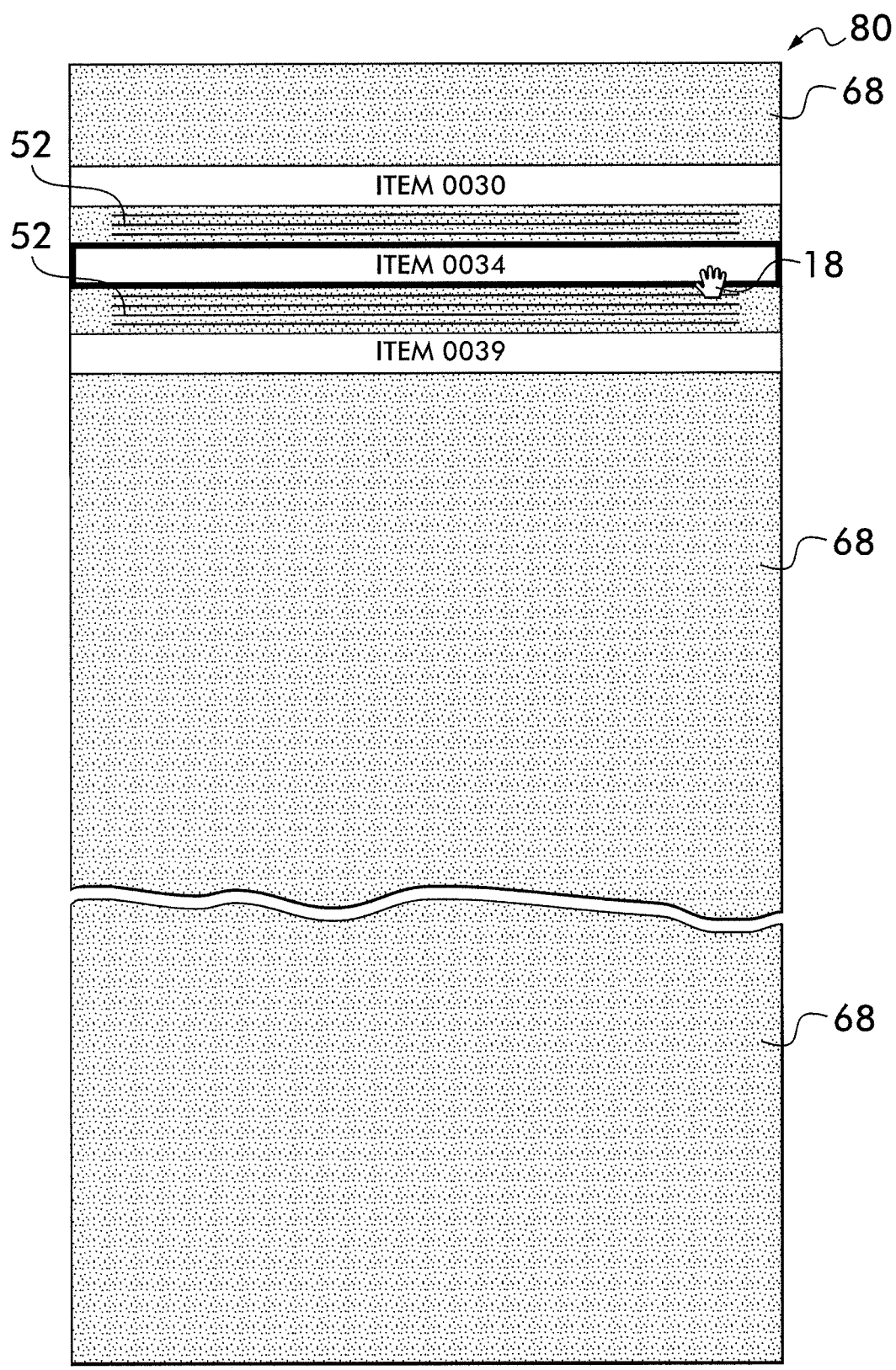
FIG. 8 shows a schematic representation of an alternate embodiment of the abstracted data item list of the present invention.

Referring now to FIGS. 7, 8, there are shown the abstracted data item list 70 and the abstracted data item list 80. In the abstracted data item list 70 a field 68 represents merged abstractions which in turn can represent a large number of data items 12. The data items 12 represented by the field 68 can be selected using a mouse, a tab key, or any other method as previously described. Furthermore, data items 12 represented by the field 68 can be located by drilling down through any number of levels of aggregation, as previously described.

In the abstracted data item list 70, Item 0034 is selected and expanded. Item 0030 and Item 0039 are also expanded in order to give the user context and to assist the user in finding a desired data item 12. The display space between Item 0030 and Item 0034 in the abstracted data item list 70, as well as the space between Item 0034 and Item 0039, can be displayed as the field 68. As shown in the abstracted data item list 80, unexpanded data items 12 between the expanded data items 12 can also be represented by aggregated abstract visual elements 52. Furthermore, they can be represented by individual visual elements 22 if the display space permits. The data items 12 between the expanded data items 12 can be represented by aggregated abstract visual elements of any level of aggregation convenient. In a preferred embodiment, the level of aggregation of the intervening aggregated abstract visual elements can be calculated automatically for the user.

Thus, when a user of an embodiment of the system and method of the present invention wants to display data items 12, the user can provide information regarding the data items 12 to be displayed by the embodiment. The embodiment can receive the data items 12 and other information from the user, or from any other source of information. It can also receive information such as the amount of display space available, the abstract visual elements being used to represent the displayed data, a preferred size of the abstractions, and any other relevant information, such as any user preferences, to make the determinations required to display the received data items 12. The system and method of the invention can determine the level of aggregation required to fit the abstract representations of the data items 12 into the available display space, or display area, and the arrangement of the abstractions. The system can determine which symbols to use as the abstract visual elements, the size of the symbols and the number of symbols. The system can then represent the data items 12 in the available display space. The user or any other party can interact with the abstractions to obtain displays of the data items 12. The invention can then provide a display of the data items 12 according to the interactions as previously described.

While the invention has been described in detail and with reference to specific examples thereof, it will be apparent to one skilled in the art that various changes and modifications can be made therein without departing from the spirit and scope thereof. For example, pop up boxes can be dialog boxes or other kinds of secondary windows that can overlay other elements of the screen. However, in another embodiment, the list itself can be expanded in place, within itself, to show underlying data items 12 as text/readable. Furthermore, such a display of selected data items 12 can be sized, oriented and located in any manner to partially or completely overlay the list of data items 12 such that it appears that the list itself is expanding in place.

What is claimed is:

1. A method for displaying information in a computer system having a visual display device with available display space for displaying representations of a plurality of data items, comprising:
   determining levels of aggregation of aggregated abstract visual elements based on a quantity of the plurality of data items and an amount of the available display space, wherein the aggregated abstract visual elements have a plurality of differing levels of aggregation and are selected to drill down from a highest level of aggregation, through intermediate levels of aggregation, to abstract visual elements and to data items;
   generating abstract visual elements that each represent a different group of the plurality of data items;
   generating the aggregated abstract visual elements that each represent a different group of the abstract visual elements;

displaying, arranged in a plurality of rows and columns, some of the plurality of data items as unabstracted data items on the visual display device and remaining data items of the plurality of data items as the aggregated abstract visual elements; and in response to drilling from the highest level of aggregation through intermediate levels of aggregation to a selected abstract visual element, expanding one or more abstract visual elements located a predetermined number of abstract visual elements before and after the selected abstract visual element, with those abstract visual elements between the selected abstract visual element and the expanded one or more abstract visual elements remaining unexpanded; and in response to receiving selection of a first icon, displaying the different group of the plurality of data items for the selected abstract visual element in a first pop up box that includes a scroll bar; and in response to receiving selection of a second icon, displaying the different group of the plurality of data items for the selected abstract visual element in a second pop up box that does not include a scroll bar.

2. The method for displaying information in a computer system of claim 1, wherein the visual display device requires a display space greater than the available display space to display the plurality of data items in an unabstracted form.

3. The method for displaying information in a computer system of claim 1, further comprising unselecting a selected aggregated abstract visual element in accordance with a further interaction.

4. The method for displaying information in a computer system of claim 1, further comprising:
varying a quantity of the expanded one or more abstract visual elements.

5. The method for displaying information in a computer system of claim 1, further comprising:
displaying a further abstract visual element in the first pop up box.

6. The method for displaying information in a computer system of claim 5, further comprising:
selecting the further abstract visual element in response to a further interaction with the further abstract visual element to display a data item of the plurality of data items represented by the selected further displayed abstract visual element.

7. The method for displaying information in a computer system of claim 1, further comprising:
providing a further aggregated abstract visual element in a pop up box.

8. The method for displaying information in a computer system of claim 1, wherein the unabstracted data items at a beginning row and an end row are displayed in text form.

9. The method for displaying information in a computer system of claim 1, further comprising:
displaying adjacent aggregated abstract visual elements.

10. A computer for displaying information having a visual display device with available display space for displaying representations of a plurality of data items, comprising:
determining, with the computer, levels of aggregation of aggregated abstract visual elements based on a quantity of the plurality of data items and an amount of the available display space, wherein the aggregated abstract visual elements have a plurality of differing levels of aggregation and are selected to drill down from a highest level of aggregation, through intermediate levels of aggregation, to abstract visual elements and to data items;

generating, with the computer, abstract visual elements that each represent a different group of the plurality of data items;

generating, with the computer, the aggregated abstract visual elements that each represent a different group of the abstract visual elements;

displaying, with the computer, arranged in a plurality of rows and columns, the plurality of data items with some of the plurality of data items as unabstracted data items on the visual display device and remaining data items of the plurality of data items as the aggregated abstract visual elements; and in response to drilling from the highest level of aggregation through intermediate levels of aggregation to a selected abstract visual element, expanding, with the computer, one or more abstract visual elements located a predetermined number of abstract visual elements before and after the selected abstract visual element, with those abstract visual elements between the selected abstract visual element and the expanded one or more abstract visual elements remaining unexpanded; and in response to receiving selection of a first icon, displaying, with the computer, the different group of the plurality of data items for the selected abstract visual element in a first pop up box that includes a scroll bar; and in response to receiving selection of a second icon, displaying, with the computer, the different group of the plurality of data items for the selected abstract visual element in a second pop up box that does not include a scroll bar.

11. The computer for displaying information of claim 10, wherein a selected aggregated abstract visual element is unselected in accordance with a further interaction.

12. The computer for displaying information of claim 10, further comprising:
displaying, with the computer, a further abstract visual element in the first pop up box.

13. The computer for displaying information of claim 10, wherein the visual display device requires a display space greater than the available display space to display the plurality of data items in an unabstracted form.

14. The computer for displaying information of claim 10, further comprising:
varying, with the computer, a quantity of the expanded one or more abstract visual elements.

15. The computer for displaying information of claim 12, further comprising:
selecting, with the computer, the further abstract visual element in response to a further interaction with the further abstract visual element to display a data item of the plurality of data items represented by the selected further abstract visual element.

16. The computer for displaying information of claim 10, further comprising:
providing, with the computer, a further aggregated abstract visual element in a pop up box.

17. The computer for displaying information of claim 10, wherein the unabstracted data items at a beginning row and an end row are displayed in text form.

18. The computer for displaying information of claim 10, further comprising:

displaying, with the computer, adjacent aggregated abstract visual elements.

\* \* \* \* \*